US012809238B2

(12) United States Patent
Palisoc et al.

(10) Patent No.: US 12,809,238 B2
(45) Date of Patent: Nov. 24, 2026

(54) CAMERA GRIP

(71) Applicant: HELIUM | DESIGN LAB, LLC, Norcross, GA (US)

(72) Inventors: Edward Palisoc, Norcross, GA (US); Hugh Brownstone, Paoli, PA (US)

(73) Assignee: HELIUM DESIGN LAB, LLC, Norcross, GA (US)

(*) Notice: Subject to any disclaimer, the term of this patent is extended or adjusted under 35 U.S.C. 154(b) by 113 days.

(21) Appl. No.: 19/041,323

(22) Filed: Jan. 30, 2025

(65) Prior Publication Data

US 2025/0251652 A1 Aug. 7, 2025

Related U.S. Application Data

(60) Provisional application No. 63/548,602, filed on Feb. 1, 2024.

(51) Int. Cl.
*G03B 17/56* (2021.01)

(52) U.S. Cl.
CPC .................................. *G03B 17/563* (2013.01)

(58) Field of Classification Search
CPC ............................ G03B 17/563; G03B 17/566
See application file for complete search history.

(56) References Cited

U.S. PATENT DOCUMENTS

| | | | | |
|---|---|---|---|---|
| 4,752,792 A * | 6/1988 | Keith | G03B 17/563 396/425 |
| 8,827,574 B2 * | 9/2014 | Johnson | H01G 9/0425 396/419 |
| 2009/0003820 A1 * | 1/2009 | Law | G03B 17/563 396/423 |
| 2015/0370149 A1 * | 12/2015 | Jackson | G03B 17/563 396/419 |
| 2022/0333730 A1 * | 10/2022 | Lenihan | F16M 13/022 |
| 2026/0079385 A1 * | 3/2026 | Sidhu | G03B 17/561 |

FOREIGN PATENT DOCUMENTS

| | | | |
|---|---|---|---|
| CN | 223662987 U * | 12/2025 | G03B 17/563 |
| KR | 200486914 Y1 * | 7/2018 | H04N 5/2251 |

OTHER PUBLICATIONS

Screen captures from YouTube video clip entitled "3D Printed camera grip with AirTag hidden inside," 6 pages, uploaded on Mar. 17, 2014 by user "etischer". Retrieved from Internet: <https://www.youtube.com/watch?v=3V7KM6-4XII>.retrieved Jul. 14, 2026.*

* cited by examiner

*Primary Examiner* — Christopher E Mahoney
(74) *Attorney, Agent, or Firm* — Pauley Erickson & Swanson

(57) ABSTRACT

A modular camera grip device and system that secures to a camera and integrates several methods to mount to several industry standard and product specific systems. The device also integrates access to attach and store a geolocation device for providing location and tracking functionality in a hidden and secure manner. The modular grip incorporates an acoustic port to enable acoustic properties of the geolocation device.

20 Claims, 4 Drawing Sheets

CAMERA GRIP

CROSS-REFERENCE TO RELATED APPLICATIONS

This application claims the benefit of U.S. Provisional Application, Ser. No. 63/548,602, filed on 1 Feb. 2024. The co-pending provisional application is hereby incorporated by reference herein in its entirety and is made a part hereof, including but not limited to those portions which specifically appear hereinafter.

BACKGROUND OF THE INVENTION

Field of the Invention

This invention relates generally to grips for enhancing the function and usability of a handheld camera.

Description of Prior Art

The increased popularity of digital and film cameras has given rise to several devices that allow additional mounting options for, and ergonomic support of, a camera (commonly known as grips, baseplates, "L-brackets", tripod quick-release plates, and cages). Camera is defined herein as any device for taking pictures and/or video, such as a digital or film-based camera and similar devices known to those having ordinary skill in the art.

One traditional device, commonly referred to as a "grip," is designed to provide additional ergonomic support through an attachment plate and a shaped grip typically attached to the baseplate. The method by which the baseplate and grip is attached to a camera typically is by a screw that threads into an industry standard ¼"-20 UNC screw tripod socket. Such devices often cover the bottom of the camera so completely, that they inhibit access to compartments or accessories that are on the bottom of the camera.

Another traditional device, commonly referred to as an "L-bracket," is typically used to change the orientation of a camera from landscape (horizontal) to portrait (vertical) without regard to handling or additional mounting points.

A third traditional device, commonly referred to as "a cage," prioritizes mounting points over ergonomics, size, and weight. These are typically although not exclusively, used for video.

Cameras and the above-described equipment are generally by nature handheld and compact and often quite expensive. Such compact, high-value equipment is thus prone to loss or theft, leaving the owner without both the equipment and the photographs stored thereon.

A need therefore exists for a camera accessory that incorporates a geotagging/tracking/location/identification device, such as an Apple AIRTAG®. It is further desirable to provide an accessory that integrates with cameras without inhibiting functionality of the camera. It is further desirable to provide an accessory that is compatible with other popular aftermarket solutions.

SUMMARY OF THE INVENTION

The present disclosure relates to a device comprised of an assembly of parts for providing a device to secure, and/or hide a geotagging device, while also providing additional grip, carrying, and mounting options for various camera types.

A modular camera grip device that allows for access to compartments and accessories integral to the function of the camera, with shaped profiles to allow ergonomic removal of digital storage media, without the need to remove the modular camera grip device and provide additional strap points. The modular design enables connection and use with different cameras without substantial change to the core components.

The present disclosure further relates to providing integrated configurations to attach to several mounting devices by being compatible with a range of functionality. Three such methods of attachment are Peak Design CAPTURE® clip and their family of compatible devices, ARCA-SWISS® compatible methods of attachment, and industry compatible devices using a ¼"-20 UNC threaded hole. CAPTURE is one embodiment of a third party accessory that enables a user's camera to be quickly accessible with the click of a button. Such clips generally includes two components: a metal clip that clamps to any backpack strap, belt, or bag, and an ARCA-SWISS® tripod-compatible plate that screws into the bottom of the camera. The camera thus locks into the clip, where it is held rigidly and securely and is quickly releasable with the push of a quick-release button. The subject invention includes functionality to attach to such an aftermarket clip and a camera without the need for an additional plate or adaptor.

The present disclosure relates to a method to switch handgrip parts without removing the baseplate to provide additional ergonomic features, such as thumb support, without dependency on an attached camera to provide support.

The present disclosure additionally relates to an assembly configured to attach to cameras of various designs, for the purpose of enhancing camera functionality, including: increasing the number of accessories that can normally be attached to a camera; increasing the number and location of mounting options; improving camera "handling" and ergonomics; maintaining acceptable mass; maintaining camera design vocabulary; substantially maintaining existing camera footprint; all without relying on additional or intermediate appurtenances Considering the limitations of known camera mounted accessory devices, it is an object of the invention to provide a single, integrated grip solution capable of being attached to a camera that provides one or more of the following features: integration of a geotagging device securely within the handgrip; securing a geotagging device in a hidden manner; permitting acoustic features of a geotag to be operational; providing support for the camera with the fingertips without the need of additional support to prevent dropping the attached camera; providing a method of attaching to ARCA-SWISS® compatible devices without the need of additional attachments and/or appurtenances; providing an integrated method of attaching to a Peak Design CAPTURE® clip and family of compatible products without additional or intermediate attachments and/or appurtenances; allowing the attachments cited above while enabling the camera to sit upright on a flat, level surface when not engaged with such solutions; providing an additional mounting point for a strap or other attachment method; providing a manner of mounting a camera, while providing access to compartments and/accessories; providing access to digital media storage without hinderance due to the shape of the opening; providing an additional industry standard ¼"-20 UNC screw hole for compatible attachment; providing a modular method to change the handgrip function with a removable handgrip; providing a thumb support without having to attach to the camera or rely on the ports or connection points on the camera; enabling fingertip carry without additional support.

Further, the device of the present disclosure will not damage the mounting surface and is lightweight and compact in size. In addition, the subject grip preferably includes a padded surface to protect the attached camera.

Other objects and advantages will be apparent to those skilled in the art from the following detailed description taken in conjunction with the appended claims and drawings.

DETAILED DESCRIPTION OF THE INVENTION

Figure 5:
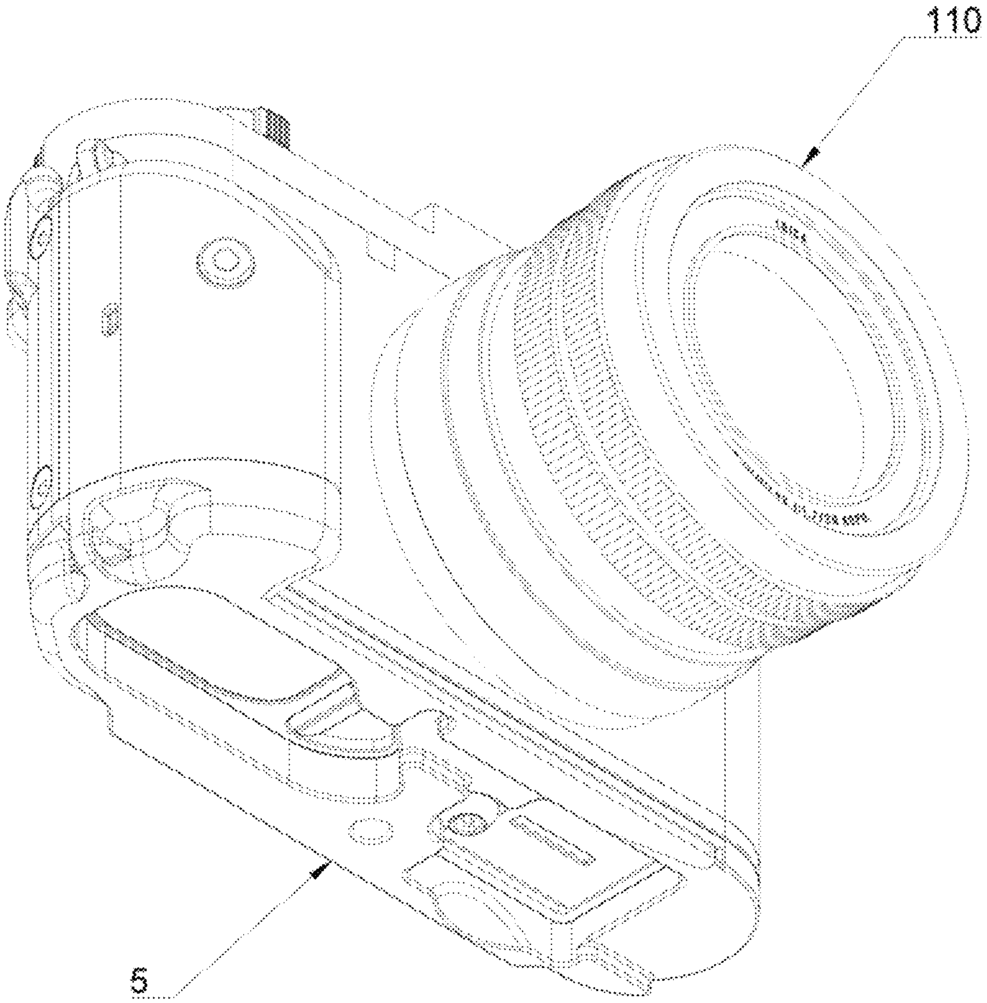
FIG. 5 shows bottom perspective view of a camera grip mounted on a camera according to one embodiment of the invention.
Figure 6:
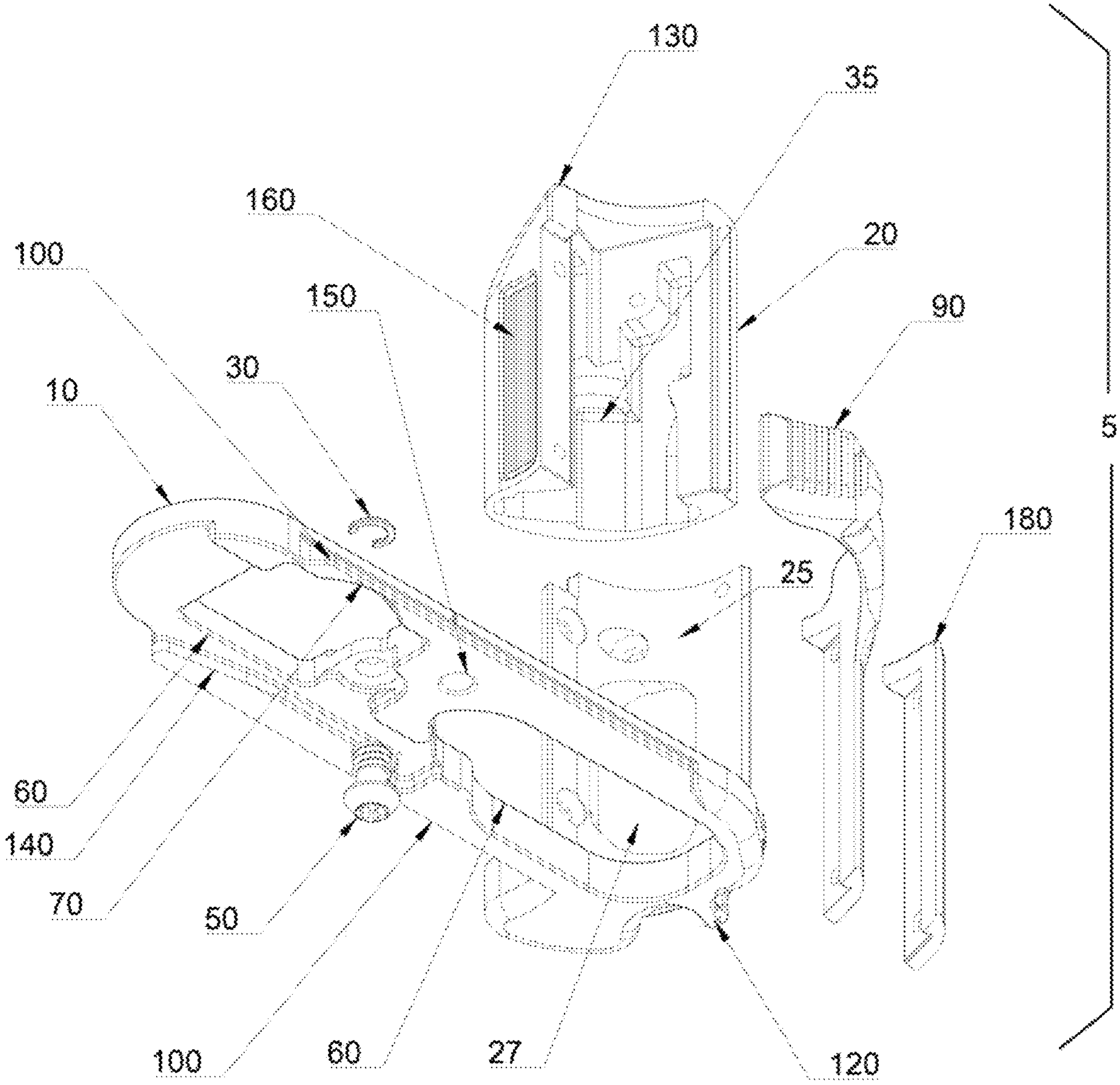
FIG. 6 shows an exploded bottom perspective view of a camera grip according to one embodiment of the invention.

With reference to the various figures, one embodiment of a modular camera grip device is shown in FIGS. 1-6. FIGS. 1-4 show various views of one preferred embodiment of the camera grip 5 while FIG. 5 shows the camera grip 5 engaged with a camera 110. Finally, FIG. 6 shows a camera grip 10 according to another preferred embodiment.

A camera grip 5 for use with a handheld camera 110 as described herein includes a baseplate 10 for attaching to the base of a camera 110. The baseplate preferably includes one or more access openings 60 extending therethrough. In one embodiment, the access openings 60 have a larger area than a material portion of the baseplate 10. However, alternatively, the access openings may comprise a small area than a material portion of the baseplate 110. Access openings 60 are intended to provide access to compartments and accessories within the camera 110, including digital storage media, batteries, battery eliminators, fasteners, and/or other components of the camera 110 that may require access which otherwise may require complete removal of a conventional camera grip. As shown in FIGS. 1-6, the baseplate 10 may include two access openings 60, at least one of the access openings including a tapered edge 70, and when the camera grip 5 is engaged with the camera 110, the tapered edge 70 is preferably provided adjacent media storage access of the camera 110 and/or other accessible areas of the bottom of the camera 110. This simplifies access to the media storage in the camera 110 and/or such other accessible areas of the bottom of the camera 110.

The baseplate 10 may additionally include an engagement profile 100 formed along at least one edge configured to engage with a mounting device, such as an ARCA-SWISS® compatible mounting device. The profiled shape 100 of the baseplate 10 allows for secure attachment with ARCA-SWISS® compatible mounting devices such as a tripod, ball head, or other industry recognized means of camera support. Such profile shape 100 may be an undercut along one or more edges of the baseplate 10.

A handgrip 20 preferably extends upwardly from the baseplate 10. The handgrip 20 is preferably mateable with the camera 110, either in an integrated manner, as shown in FIGS. 1-4, or in a modular manner as described in more detail below. The handgrip 20 preferably includes a curved exterior surface 130 that ergonomically permits a secure and substantial area for a photographer to grasp and hold while still permitting manipulation of the camera 110 under a range of conditions. The handgrip 20 may include knurling or serrations 160 to ensure a tactile and reliable grip by the user.

The handgrip 20 preferably further includes a central cavity 35 therein, the central cavity 35 accessible only when the camera 110 is removed from the camera grip 5. The central cavity 35 is preferably configured to accommodate geotagging/tracking/location/identification device (hereinafter a "geolocation device," not shown) such as an Apple AIRTAG®. In one preferred embodiment, the cavity comprises a slotted space within the handgrip 20 to accommodate the geolocation device. In a preferred embodiment, the geolocation device is secured within the handgrip 20 once the handgrip 20 is affixed to the camera grip 5 and/or the camera 110. The handgrip 20 may further include one or more acoustic vent ports 80 that extend from the central cavity 35 to an exterior of the handgrip 20. The acoustic vent ports 80 preferably enable acoustic features of potential geotagging devices to escape without interference.

The combination of the interior placement of the cavity 35 within the handgrip 20 and the security screw 50, discussed below, prevents a potential thief from identifying that a geotagging device is present and from removing the geotagging device without a specialty tool. According to a preferred embodiment of this invention, a third party does not even realize the geolocation device is present on the camera.

According to one embodiment best shown in FIG. 6, the camera grip 5 may include a baseplate 10 having an upright 25 integrated with the baseplate 10. In this embodiment, the upright 25 preferably extends from the baseplate 10 and provides a mount for the desired handgrip 20 which may be removably attached to the upright 25. This embodiment permits attachment of alternative handgrips that are removably attachable with the upright 25 to enable selectable, modular handgrips depending on the camera 110 used and/or an intended camera configuration. According to this embodiment, one of either the upright 25 and the handgrip 20 may include a contoured inner surface mateable with an outer surface of the camera 110. As shown in FIG. 6, the upright 25 includes a contoured inner surface and the handgrip 20 is affixed to an outer surface of the upright 25. As shown, the upright may include an access aperture 27 to provide access to the cavity 35 within the handgrip 20.

According to a preferred embodiment, the baseplate 10 may include a security screw 50 extending through the baseplate 10 to attach the camera grip 5 to the camera 110. The security screw 50 preferably includes a retaining clip 30 positioned on an opposite side of the baseplate 10 from a head of the security screw 50 to retain the security screw 50 on the baseplate 10. The security screw is preferably a TORX®, hex key, or similar type non-conventional screw head to prevent tampering with the camera grip 5 with a conventional screwdriver like a flathead or Phillips head. In addition, the baseplate 10 may further include an aperture 150 sized to accommodate a ¼"-20 UNC attachment screw.

As shown in FIGS. 1-4, the camera grip 5 may further includes an integrated thumb support 90 extending from the handgrip. Alternatively, as shown in FIG. 5, the thumb support 90 may be removably attachable to the upright. In either embodiment, the thumb support 90 is preferably not affixed directly to the camera 110 and/or may be configured to partially wrap around a body of the camera. In this manner, the camera grip 5 may employ a more modular design to enable mixing and matching of desired features. In partial furtherance of this modularity, the camera grip 5 shown in FIG. 6 may include a removably attachable cover plate 180 connected to the upright 25 when an alternative accessory such as the thumb support 90 is not in place. The cover plate 180 is thus configured to fit into an accessory attachment area of the upright 25. As shown and described in either embodiment, the thumb support 90 does not rely on the camera 110 for support or a means of anchoring.

The camera grip 5 may further include an elongated attachment ring 120 provided in the baseplate 10. The attachment ring 120 preferably includes a central elongated opening extending in a direction perpendicular to the at least one access opening 60. The attachment ring 120 may be used to support or anchor the camera grip 5 using various methods such as a strap system or a split ring.

The camera grip 5 may additionally include a protective isolation pad 40 attached to the baseplate 10 to prevent contact between the camera 110 and the baseplate 10. The isolation pad 40 may be adhesively affixed or simply a gasket that is placed over the footprint of the baseplate 10.

Figure 1:
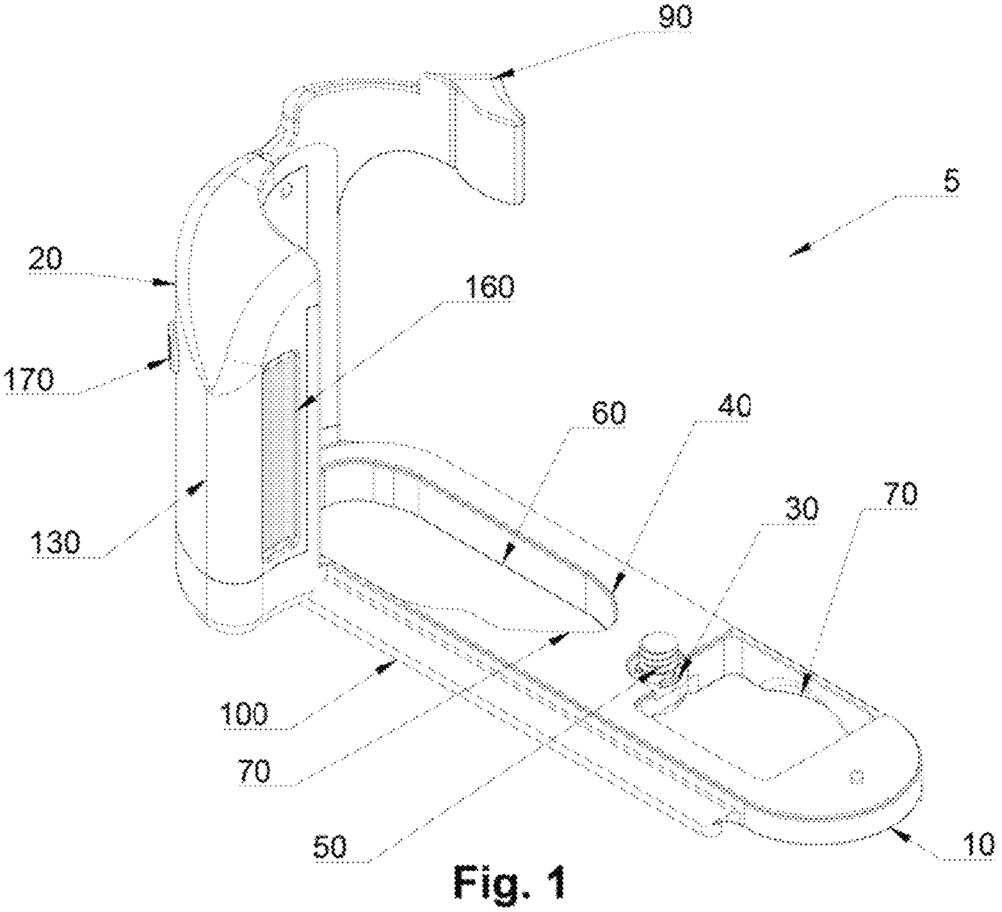
FIG. 1 shows a front perspective view of a camera grip according to one embodiment of the invention.
Figure 2:
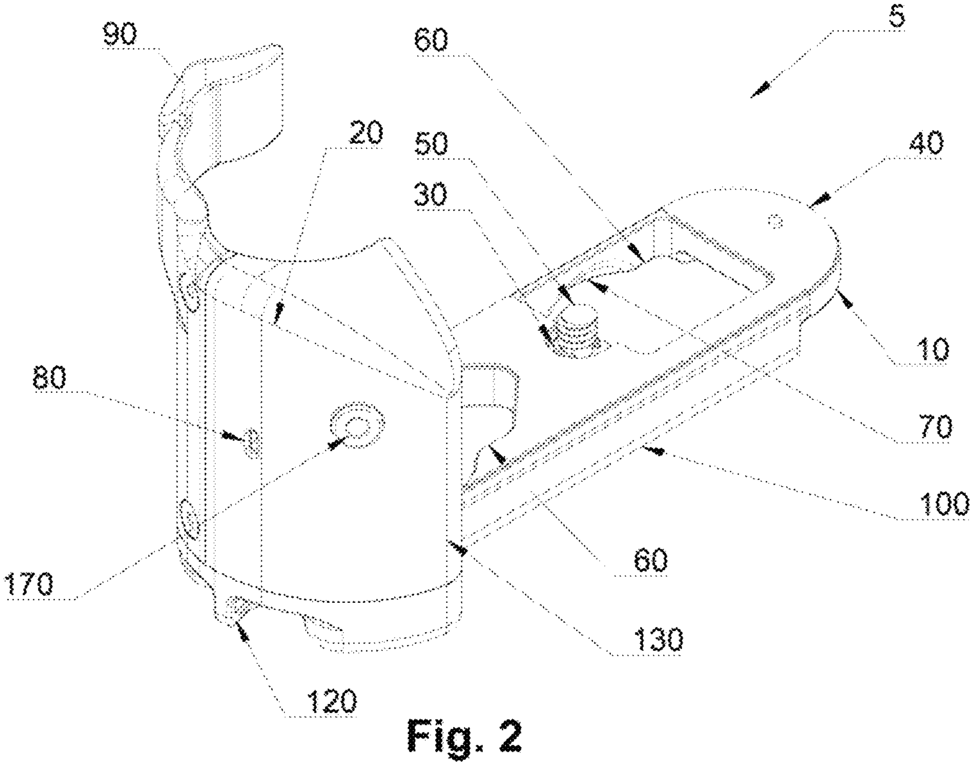
FIG. 2 shows a rear perspective view of the camera grip shown in FIG. 1.
Figure 3:
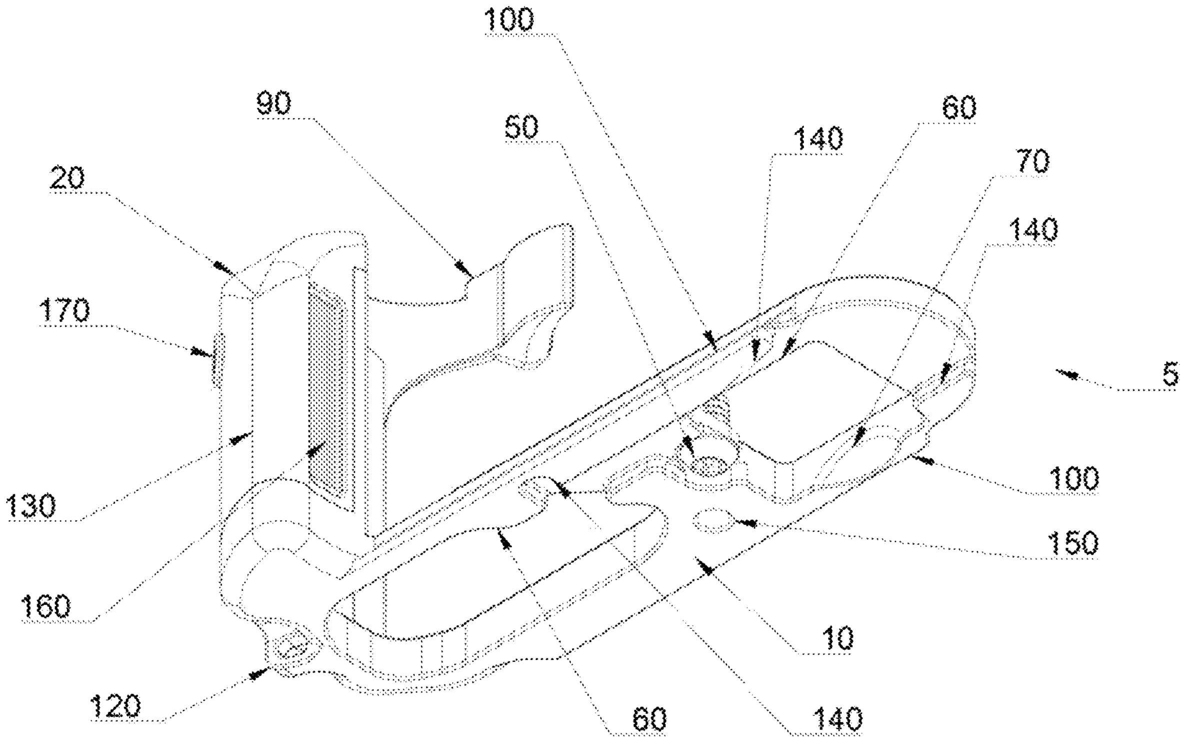
FIG. 3 shows a bottom perspective view of the camera grip shown in FIG. 1.
Figure 4:
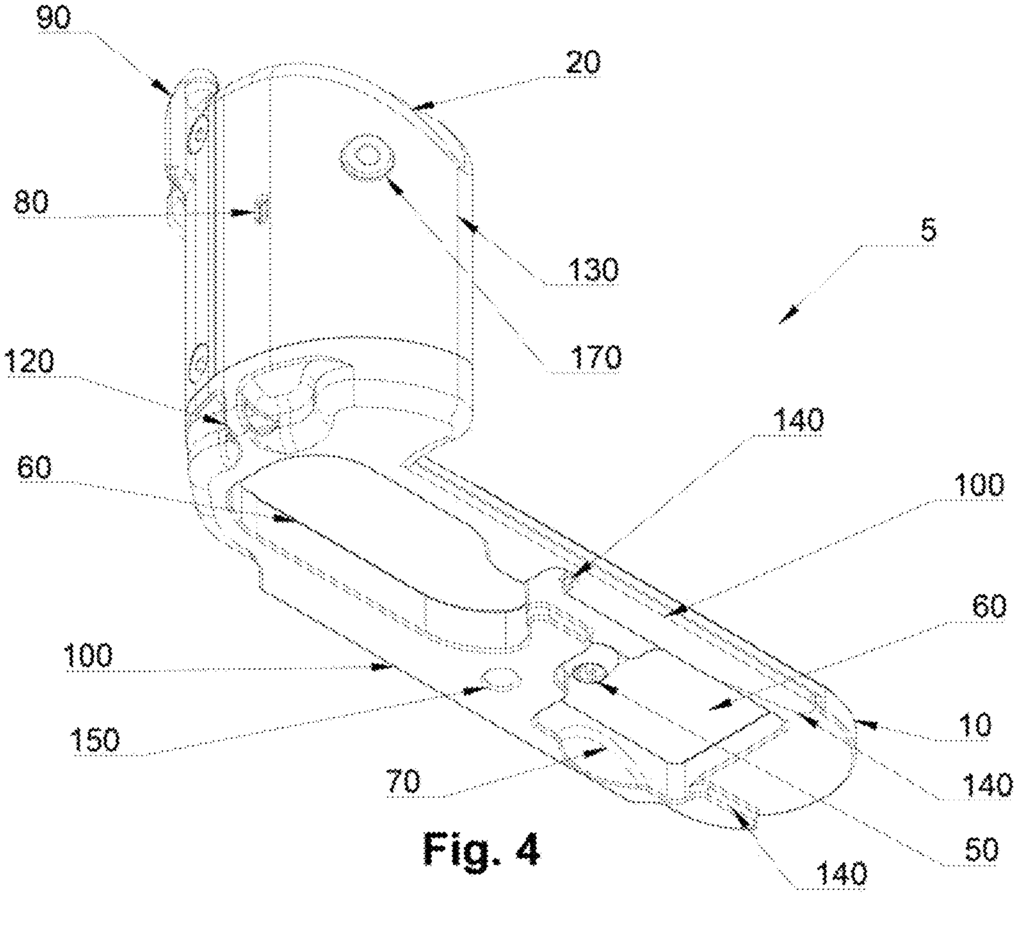
FIG. 4 shows a bottom perspective view of the camera grip shown in FIG. 1.

The embodiment of the profiled shape item 140 incorporated into the baseplate item 10 allows the modular handgrip device FIG. 1 to interact with and attach to PEAK DESIGN Capture Clips and associated compatible accessories without the dependency of additional devices or attachments, by inserting, sliding and locking, or other designed attachment methods, using the normal means of function of the compatible devices.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

We claim:

1. A camera grip for use with a handheld camera, the camera grip comprising:

- a baseplate having one or more access openings extending therethrough, the access openings having a larger area than a material portion of the baseplate; and
- a handgrip extending upwardly from the baseplate, the handgrip mateable with the camera and having a central cavity therein, the central cavity accessible only when the camera is removed from the camera grip, the central cavity configured to accommodate a geolocation device, wherein the central cavity includes one or more acoustic vent ports extending from the central cavity to an exterior of the handgrip.

2. The camera grip of claim 1 further comprising an upright integrated with the baseplate, the handgrip removably attached to the upright.

3. The camera grip of claim 2 wherein an alternative handgrip is removably attachable with the upright to enable selectable, modular handgrips depending on an intended camera configuration.

4. The camera grip of claim 2 wherein one of the upright and the handgrip includes a contoured inner surface mateable with the camera.

5. The camera grip of claim 2 further comprising a removably attachable thumb support attached to the upright and configured to partially wrap around a body of the camera.

6. The camera grip of claim 2 further comprising a removably attachable cover plate connected to the upright, the cover plate configured to fit into an accessory attachment area of the upright.

7. The camera grip of claim 1 wherein the at least one access opening in the baseplate includes a tapered edge, and when the camera grip is engaged with the camera, the tapered edge is provided adjacent at least one of media storage access and battery access of the camera.

8. The camera grip of claim 1 further comprising an elongated attachment ring provided in the baseplate, the attachment ring including a central elongated opening extending perpendicular to the at least one access opening.

9. The camera grip of claim 1 wherein the baseplate includes an engagement profile formed along at least one edge configured to engage with a mounting device.

10. A camera grip for use with a handheld camera, the camera grip comprising:

- a baseplate having one or more access openings extending therethrough, the access openings having a larger area than a material portion of the baseplate;
- a handgrip extending upwardly from the baseplate, the handgrip mateable with the camera and having a central cavity therein, the central cavity accessible only when the camera is removed from the camera grip, the central cavity configured to accommodate a geolocation device; and
- a security screw extending through the baseplate, the security screw including a retaining clip.

11. The camera grip of claim 10 wherein the central cavity includes one or more acoustic vent ports extending from the central cavity to an exterior of the handgrip.

12. The camera grip of claim 10 wherein the baseplate further comprises an aperture sized to accommodate an attachment screw.

13. A camera grip for use with a handheld camera, the camera grip comprising:

- a baseplate having one or more access openings extending therethrough, the access openings having a larger area than a material portion of the baseplate;
- a handgrip extending upwardly from the baseplate, the handgrip mateable with the camera and having a central cavity therein, the central cavity accessible only when the camera is removed from the camera grip, the central cavity configured to accommodate a geolocation device; and
- an integrated thumb support extending from the handgrip without direct attachment to the camera.

14. A camera grip for use with a handheld camera, the camera grip comprising:

- a baseplate having one or more access openings extending therethrough;
- an upright integrated with and extending upwardly from the baseplate;
- a handgrip removably attached to the upright, the handgrip having a central cavity therein, the central cavity accessible only when the camera is removed from the camera grip, the central cavity configured to accommodate a geolocation device, wherein the handgrip attaches to an outer surface of the upright and the upright is configured to abut the camera when mounted.

15. The camera grip of claim 14 further comprising at least two access openings in the baseplate, the access openings having a larger area than a material portion of the baseplate.

16. The camera grip of claim 14 further comprising a removably attachable thumb support connected to the upright and configured to partially wrap around a body of the camera.

17. The camera grip of claim 14 further comprising an acoustic port extending from the central cavity to an exterior of the handgrip.

18. The camera grip of claim 14 wherein the central cavity is not visible from an exterior of the camera grip when mounted to a camera.

19. A camera grip for use with a handheld camera, the camera grip comprising:

a baseplate having one or more access openings extending therethrough;

an upright integrated with and extending upwardly from the baseplate;

a handgrip removably attached to the upright, the handgrip having a central cavity therein, the central cavity configured to accommodate a geolocation device; and an acoustic port extending from the central cavity to an exterior of the handgrip.

20. The camera grip of claim 19 wherein the handgrip attaches to an outer surface of the upright and the upright is configured to abut the camera when mounted.

* * * * *